DIGITAL CONVERTERS

Filed Sept. 28, 1964 5 Sheets-Sheet 1

INVENTOR.

Donald J. Abel

Sept. 2, 1969 D. J. ABEL 3,465,329

DIGITAL CONVERTERS

Filed Sept. 28, 1964 5 Sheets-Sheet 2

INVENTOR.

Donald J. Abel

DIGITAL CONVERTERS

Filed Sept. 28, 1964 5 Sheets-Sheet 3

INVENTOR.

Donald J. Abel

Sept. 2, 1969 D. J. ABEL 3,465,329

DIGITAL CONVERTERS

Filed Sept. 28, 1964 5 Sheets-Sheet 4

INVENTOR.

Donald J. Abel

INVENTOR.
Donald J. Abel

United States Patent Office 3,465,329
Patented Sept. 2, 1969

3,465,329
DIGITAL CONVERTERS

Donald J. Abel, 712 Summit Ave.,
Franklin Lakes, N.J. 07417

Filed Sept. 28, 1964, Ser. No. 399,464
Int. Cl. H04l 3/00
U.S. Cl. 340—347 2 Claims

ABSTRACT OF THE DISCLOSURE

A digital-to-analog converter requiring external support is disclosed. The digital signals excite polar electro magnets which position coupled actuator members which have code members pivotally attached thereto. The code members have output members, including a pointer, coupled to them for movement indicative of the input digital signals.

This invention relates in general to converting devices and more particularly to a device that positions an output from various input combinations.

It is an object of the instant invention to provide a digital converting device with a small number of parts.

Another object is to provide a converting device with directed and rigid members from input signals to output.

A further object is to provide a digital converting device that can be applied to numerous types of equipments.

Another object of the instant invention is to provide a digital converting device with low inertia to be used for high speed applications.

Another object is to provide a digital converter that can operate at low input power levels.

A further object is to provide a converting mechanism that is capable of memorizing the last coded position.

An additional object is to provide a mechanism that can combine the selecting and converting functions into one.

Another object is to provide a digital converter that has the capability of either remaining in the last position or returning to a home position after every operation.

Another object is to provide a converting device that with minor variations numerous code levels aer obtainable.

A further object is to provide a converting device capable of processing Baudot code for teletypewriter applications.

Other objects of the instant invention will become apparent in the course of the following specification.

The digital converter is a basic mechanism and has applications in many products which include the following: remote control systems, remote signaling devices, displays, typewriters, decoders, telegraph printing apparatus, and digital signal processing equipment.

In the attainment of aforesaid objectives, subject digital converters is made in three embodiments. The embodiments are similar in function and structure. They differ in respect to the code level obtainable and the type of input motion applied.

A fuller understanding of the invention may be had by referring to the following descriptions and claims, taken in conjunction with the accompanying drawings in which:

Figure 1:
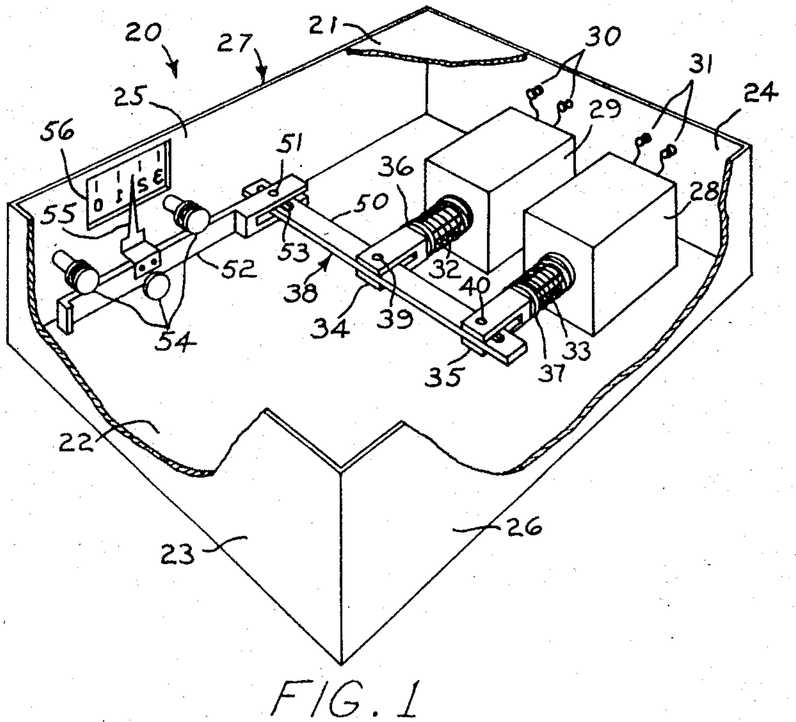
FIGURE 1 is a perspective view of a two level digital code mechanism with electro mechanical actuators.

Referring now to FIGURE 1 the numeral 20 indicates the converter. The converter mechanism is mounted in a casing 27 with sides 25, 24, 26, 23, 21 and 22. Solenoids 28 and 29 are attached to side 22 by any known means that will permit removal. Electrical connections 30 and 31 connect solenoids 29 and 28 respectively to external sources of power. Compression spring 32 against collar 36 and the body of solenoid 29 retain plunger 34 in its outward position until energized. Rearward motion is restricted by the internal configuration of the plunger. Spring 33 performs a similar function for plunger 35 of solenoid 28. Plungers 34 and 35 project through the back ends of solenoids 29 and 28 respectively where they contain adjustable stops to limit their forward motion. The forward ends of plungers 34 and 35 have openings to assemble code member 38 with sufficient clearance to allow linear and rotational movements. Pins 39 and 40 are assembled fixed to plungers 34 and 35 respectively and contain code member 38 which has openings to allow for rotation and translation. Spacing between the solenoids may be varied to obtain various output movements of code member 38. End 50 of code member 38 has a slotted opening 53 through which pin 51 is assembled. Pin 51 is assembled fixed to output member 52. Output member 52 has an opening at one end to contain code link 38 with clearances for movements. Three roller supports 54 mounted to side 25 of casing 27 contain output member 52 permitting it to move in a linear direction. Attached to output member 52 by any known means that will permit removal is pointer 55. Inserted in side 25 of casing 27 and fixed to it is transparent scale 56 that enables viewing of pointer 55 from outside of casing 27. The four code link positions obtained from the various on off combinations of solenoids 29 and 28 are indicated by the pointer position on scale 56.

Figure 2:
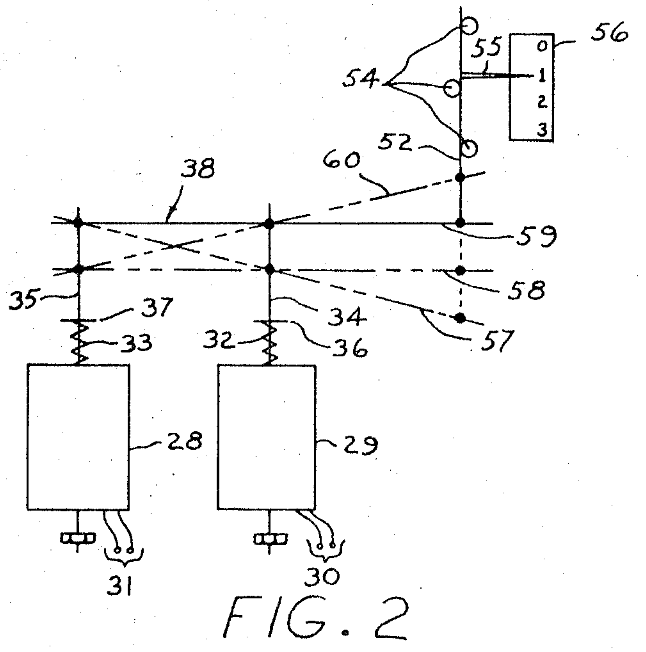
FIGURE 2 is a schematic of the numerous positions of the mechanism shown in FIGURE 1. The alternate positions are indicated by dotted lines.

A schematic of the mechanism movements of FIGURE 1 is shown in FIGURE 2 using the same numerals for the same parts. When neither solenoid 28 or 29 is actuated, code member 38 takes a position indicated by numeral 59. If solenoid 28 is actuated but not solenoid 29 code member 38 takes a position indicated by numeral 60. If both solenoids are actuated code member 38 will take a position indicated by numeral 58. Position 57 is obtained when solenoid 29 is actuated but not solenoid 28. The output member 52 is positioned by the code member 38, in turn said output member positions pointer 55 relative to scale 56. The characters indicated are therefore a function of the coded solenoid pulses.

Figure 3:
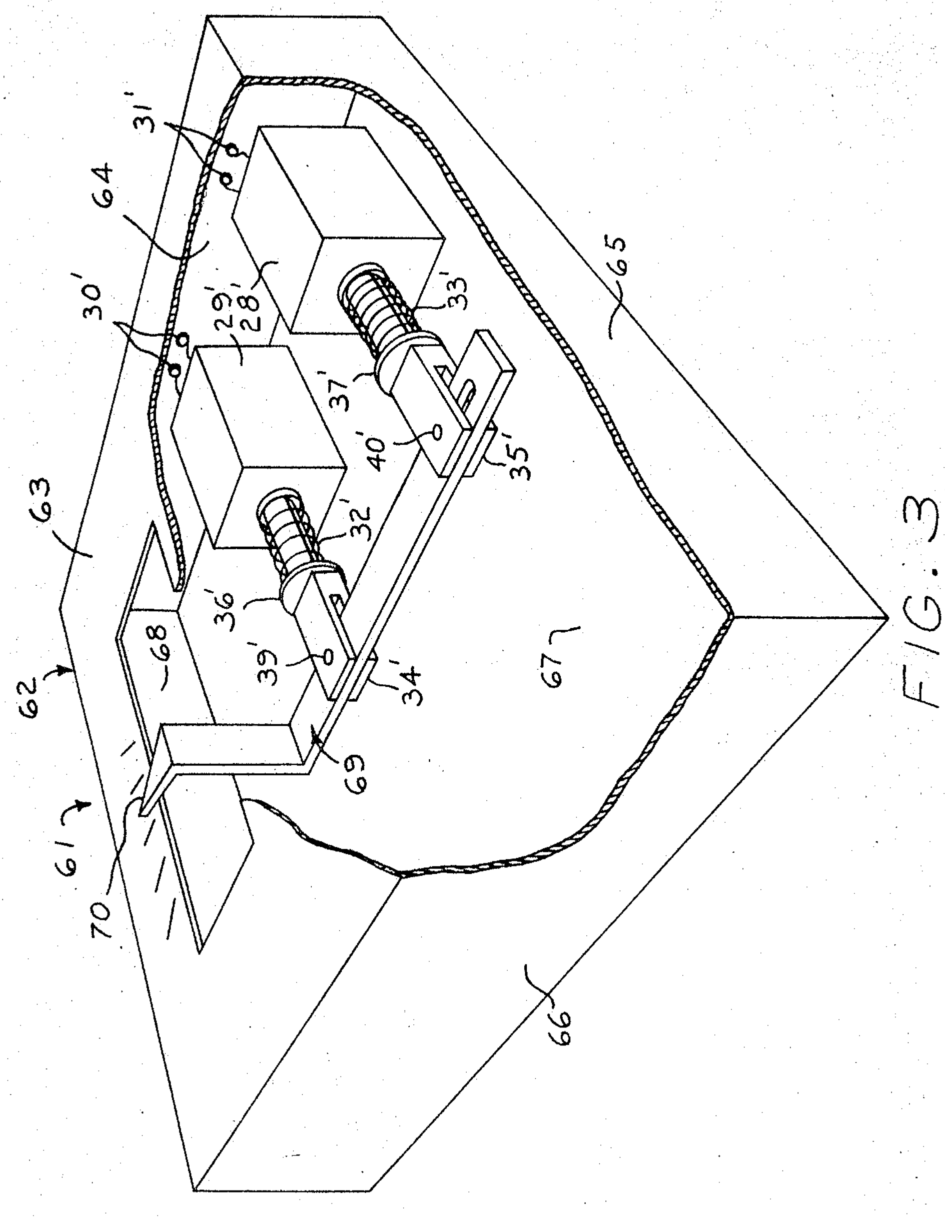
FIGURE 3 is a perspective view of a two level digital code mechanism with direct visual readout.

Referring now to FIGURE 3 the converter is indicated by numeral 61. A casing 62 with sides 63, 64, 68, 67, 66 and 65 houses the converter mechanism. Side 63 has an opening for the extension of code link 69 external to the casing where end 70 of code member 69 will indicate the coded character being processed. The solenoids 29' and 28' and their coacting parts indicated by prime numbers are in the same spaced relationship and are the same as shown in FIGURE 1. Coded characters are therefore directly displayed by code member 69.

Figure 4:
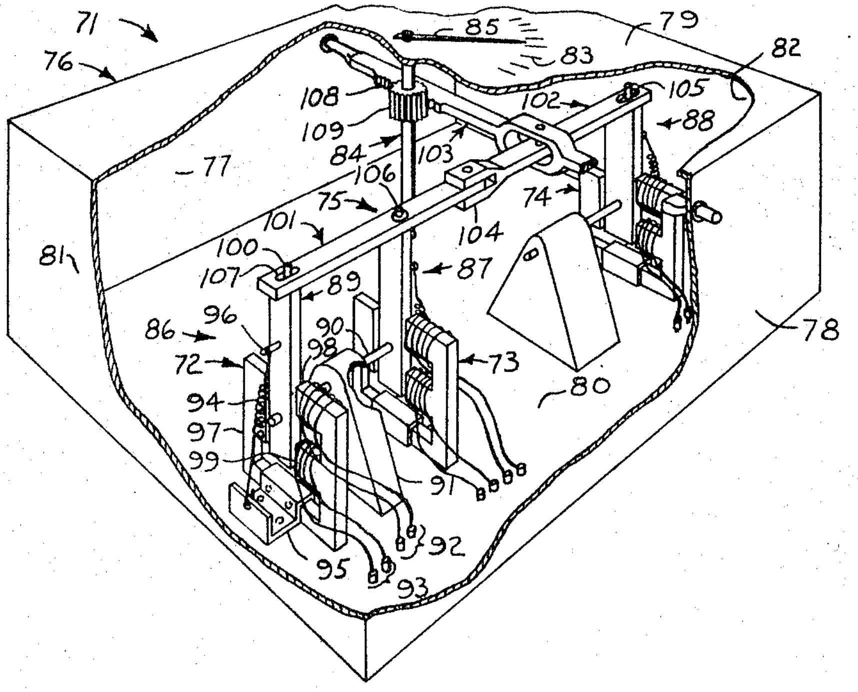
FIGURE 4 is a perspective view of a three level digital code mechanism with actuators that are capable of retaining the mechanism in the last coded position.

Referring now to FIGURE 4 numeral 71 indicates the converter with polar actuators 72, 73, and 74. The mechanism 75 is mounted in casing 76 which has sides 77, 78, 79, 80, 81, and 82. Side 79 has markings 83 to indicate through pointer 85 the position of output shaft 84. Output shaft 84 is located by bearings in sides 79 and 80. Actuator assembly 86 has actuating member 89 that rotates on pivot shaft 90. Pivot shaft 90 is mounted in block 91 which is attached by any known means to side 80. Actuating member 89 is moved in a counter clockwise or clockwise direction on pivot shaft 90 depending on the electrical excitation of either mark coil 92 or space coil 93 of polar actuator 72. Toggle spring 94 mounted between spring post 96 and bracket 95 retains actuating member 89 in the last signaled position until the next electrical excitation. Spring post 96 is fixed to actuating member 89 by any known means. Bracket 95 is attached to side 80 by any known means that will permit removal and holds polar actuator 72 in its correct position. Polar actuator 72 has a permanent magnet body 97 whose flux path is deviated into one of the two electro magnetic legs 98 or 99 by mark coil 92 or space coil 93. The flux path will then attract actuating member 89 into one of the two positions about pivot shaft 90. Actuating member 89 is constrained along pivot shaft 90 between the poles of polar actuator 72 by any known means that will permit removal. Attached to the other end of actuating member 89 by any known means that will permit removal is pivot 100 which constrains the first code member 101 to a specific movement. Actuator assemblies 87 and 88 are the same as actuator assembly 86 in structure. They differ in respect that actuator assemblies 86 and 87 control the movements of first code member 101 and actuator assembly 88 with the first code member 101 controls the movement of second code member 102. Pinned to the second code member 102 at an intermediate position is output member 103 supported by linear bearings in sides 77 and 78. At yoke end 104 of the second code member 102 is the first code member 101. Opening 105 of the second code member 102 that accepts the pivot of actuator assembly 88 allows for some radial and angular movement. The opening of the first code member 101 that is pinned to the yoke end of the second code member 102 allows for some radial movement. Opening 106 of the first code member 101 will allow for some angular movement of the actuating member of actuating assembly 87. Opening 107 of the first code member 101 will allow for some radial and angular movement. Output member 103 whose position is a function of the two said code members contains a rack portion 108 that meshes with a gear 109 which is mounted to output shaft 84. Output member 103 therefore rotates output shaft 84.

Figure 5:
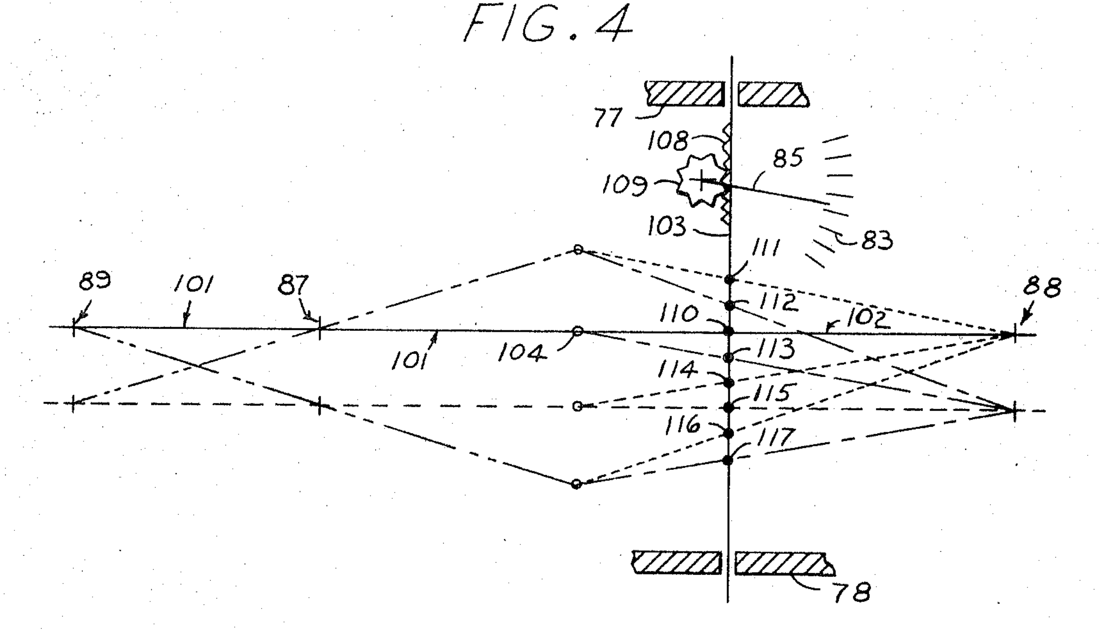
FIGURE 5 is a partial schematic of the various code positions of the mechanism shown in FIGURE 4. The alternate positions are indicated by dotted lines.

A partial schematic of the movements of the code members of FIGURE 4 is shown in FIGURE 5 using the same numerals for the same parts. Alternate positions of code members 102 and 101 are shown in dotted lines. When actuating assemblies 89, 87, and 88 are in their counter clockwise position output member 103 takes position 110. With actuating assemblies 87 and 88 remaining in the stated position and actuating assembly 89 is in its clockwise position output member 103 takes position 111. The following positions of output member 103 result from the listed positions of actuating assemblies 89, 87, and 88:

| Actuating assembly 89 | 87 | 88 | Output member position |
|---|---|---|---|
| ccw | ccw | ccw | 110 |
| cw | ccw | ccw | 111 |
| cw | ccw | cw | 112 |
| ccw | ccw | cw | 113 |
| cw | cw | ccw | 114 |
| cw | cw | cw | 115 |
| ccw | cw | ccw | 116 |
| ccw | cw | cw | 117 |

The various positions of output member 103 through rack 108 meshing with gear 109 to rotate the output shaft pointer 85 will be indicated at 83.

Figure 6:
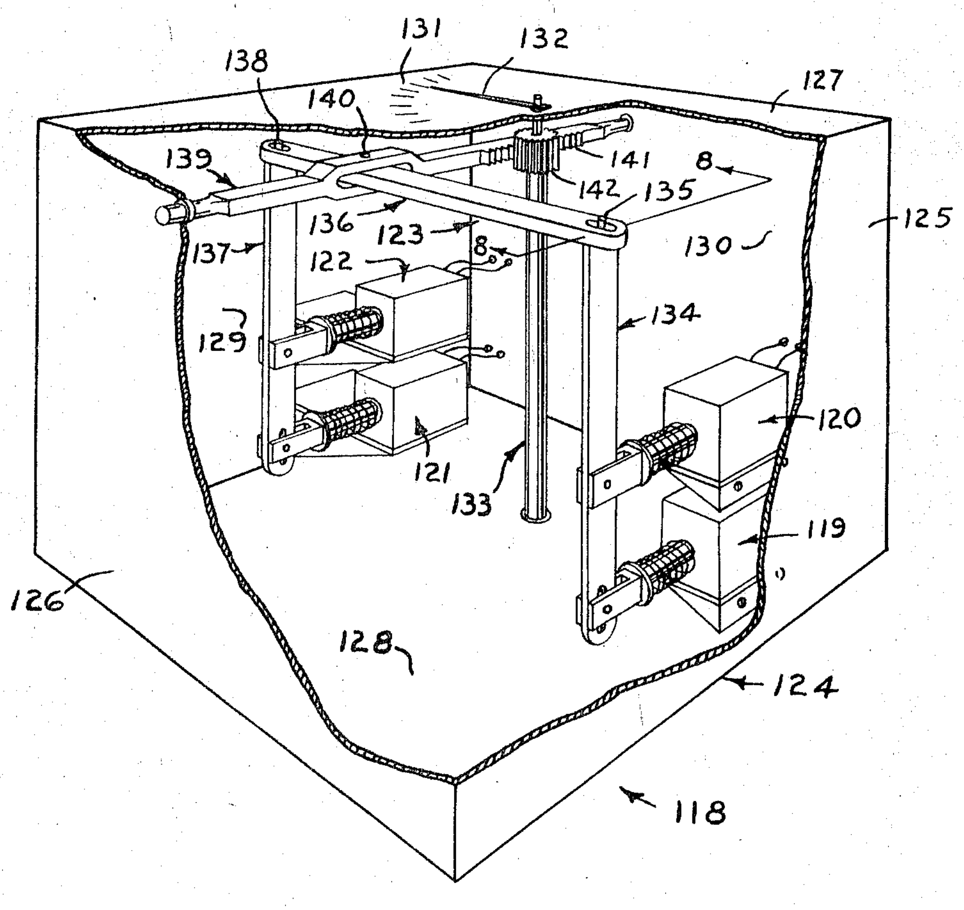
FIGURE 6 is a perspective view of a four level code mechanism with electro mechanical actuators.
Figure 8:
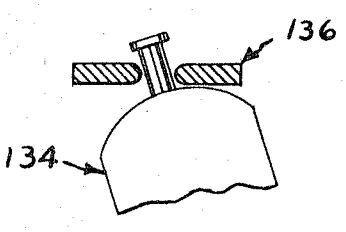
FIGURE 8 is a perspective view of an example of the coupling mechanism between code members.

Referring to FIGURE 6 numeral 118 indicates the converter with electro mechanical actuators 120, 119, 121, and 122. The mechanism 123 is mounted in casing 124 which has sides 125, 126, 127, 128, 129, and 130. Side 127 has markings 131 to indicate through pointer 132 the position of output shaft 133. Output shaft 133 is located by bearings in sides 127 and 128 and has pointer 132 attached by any known means that will permit removal. Actuator assemblies 120, 119, 122, and 121 have the same parts and methods of actuation as solenoids 28 and 29 and their associated parts as shown in FIGURE 1. Actuator assemblies 120 and 119 are mounted to side 125 by any known means that will permit removal. Actuator assemblies 122 and 121 are mounted by any known means that will permit removal to side 129. First code member 134 is attached by pins to the plungers of actuators 120 and 119. The opening in the first code member 134 that is pinned to the plunger of actuator 119 allows for radial movement. Pin 135 is attached to first code member 134 by any known means that will permit removal and links said member to third code member 136. FIG. 8 shows one such coupling that may be used. Second code member 137 is attached by pins to the plungers of actuators 121 and 122. The opening in the second code member 137 that is pinned to the plunger of actuator 121 allows for radial movement. Pin 138 is attached to second code member 137 by any known means that will permit removal and links said member to third code member 136. Third code member 136 is pinned to output member 139 at section 140. The openings in third code member 136 that receive pins 138 and 135 allow for radial and angular movement. Output member 139 is supported in sides 130 and 126 by linear bearings and has a gear toothed section 141 that engages pinion 142 of output shaft 133. The various coded movements of mechanism 123 through output member 139 and output shaft 133 are indicated at markings 131.

Figure 7:
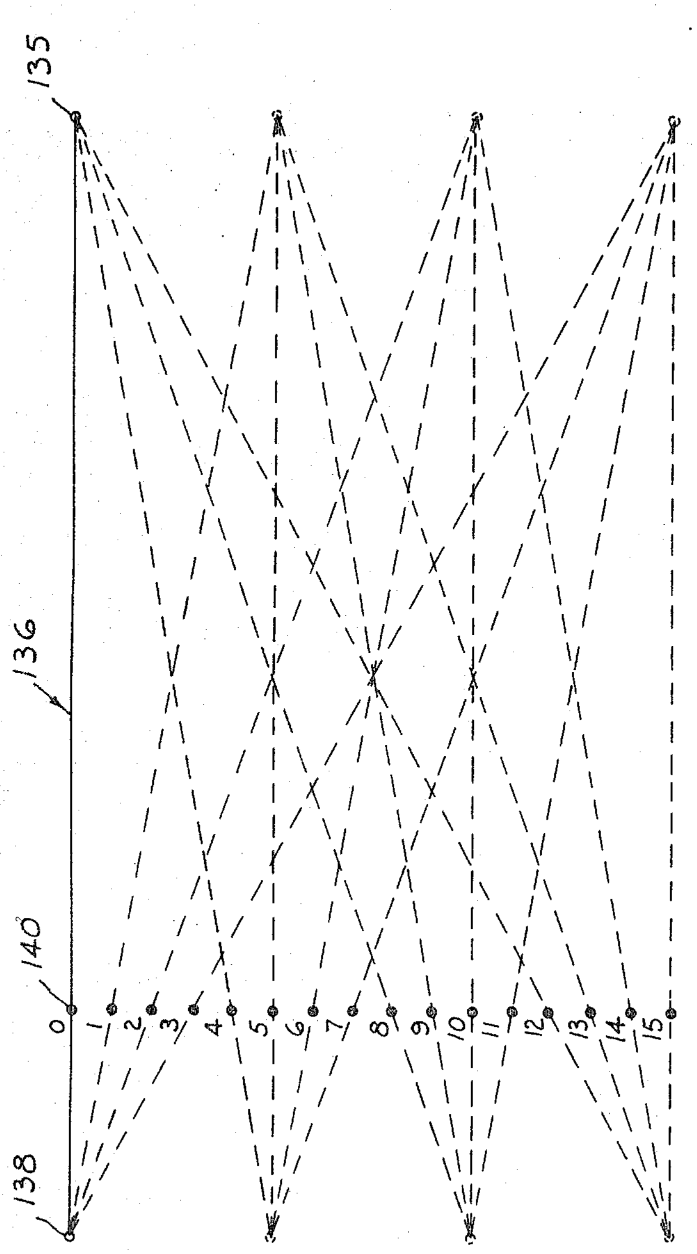
FIGURE 7 is a schematic of the various code positions of the mechanism shown in FIGURE 6. The alternate positions are indicated by dotted lines.

FIGURE 7 is a partial schematic of the various positions of the third code member 136 as shown in FIGURE 6. The four positions at point 135 from first code member 134 combined with the four positions of second code member 137 at point 138 result in the sixteen positions at output member point 140.

In operation the input information to the digital converter mechanism could be made available from a source outside the casing, and other than the electro mechanical actuators illustrated. In addition the actuating means may move independent of each other. The actuators and code members whose number will vary depending on the code level desired move in predetermined positions driven by the input information. Various combinations of the code members result in numerous positions of the output member. Any one output position is separate and distinguishable from any other position. The movements described and mechanisms may be combined to form complex machines whose output can be of a visual, printed or electrical mode among others.

Although I have described my invention with a certain degree of particularity it is understood that the present disclosure has been made only by way of example and that numerous changes in the details of construction and the combination and arrangement of parts may be resorted to so they may be utilized in the products described without departing from the spirit and scope of the invention as hereinafter claimed.

I claim as my invention:

1. A converter requiring external support comprising, three polar electro magnets excited by external signals, three actuating members one for each electro magnet pivotable in two positions between the magnetic poles, toggle springs attached to said actuating members to hold them in the last actuated position, two code members of which one is attached to two actuating members and the other attached to the third actuating member, and said first code member, an output member with a geared section attached to said other code member, attachment means between said code members, an output shaft having a gear engaged with the geared section of said output member, a pointer attached to the output shaft to indicate the code position with respect to markings displayed on the converter.

2. A converter requiring external support, comprising, three polar electro magnets excited by external signals, three actuator members one for each electro magnet and pivotally attached thereon, force members attached to said actuating members urging them to the last actuated position, two elongate code members in combination of which the first is pivotally attached to two actuating members and the second pivotally attached to the third actuating member and said first code member at its end, an elongate output member mounted for linear movement on the support and atttached to the elongate code member combination having a section capable of meshed engagement, a rotary output member mounted in the support in meshed engagement with said elongate output member having an indicator attached thereon, markings on the support in spaced relation to said indicator to display eight code positions.

References Cited

UNITED STATES PATENTS

| | | | |
|---|---|---|---|
| 2,783,464 | 2/1957 | Canepa | 340—347 |
| 3,234,546 | 2/1966 | Ellner et al. | 340—347 |

MAYNARD R. WILBUR, Primary Examiner

M. K. WOLENSKY, Assistant Examiner